(12) United States Patent
Fujiwara

(10) Patent No.: US 7,780,390 B2
(45) Date of Patent: Aug. 24, 2010

(54) CONTAINER INSPECTION/CARGO-HANDLING METHOD AND CONTAINER INSPECTION/CARGO-HANDLING SYSTEM

(75) Inventor: Kiyoshi Fujiwara, Chuo-ku (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 541 days.

(21) Appl. No.: 10/590,303

(22) PCT Filed: Mar. 11, 2005

(86) PCT No.: PCT/JP2005/004361

§ 371 (c)(1),
(2), (4) Date: Sep. 1, 2007

(87) PCT Pub. No.: WO2005/087633

PCT Pub. Date: Sep. 22, 2005

(65) Prior Publication Data

US 2008/0025825 A1    Jan. 31, 2008

(30) Foreign Application Priority Data

Mar. 12, 2004    (JP)    ............................. 2004-070884

(51) Int. Cl.
*B63B 27/00*    (2006.01)
(52) U.S. Cl. ...................... 414/140.3; 414/279; 378/57; 378/198
(58) Field of Classification Search .................... 104/29, 104/91; 180/168; 250/363.02, 369; 378/198, 378/57; 414/139.9, 140.3, 140.4, 141.3, 414/141.6, 140.1, 273, 279; 700/218; 212/271, 212/325
See application file for complete search history.

(56) References Cited

U.S. PATENT DOCUMENTS

| 724,859 | A | * | 4/1903 | Harding | ........................ 104/91 |
| 3,754,669 | A | * | 8/1973 | Alsen | ....................... 414/140.8 |
| 5,910,973 | A | * | 6/1999 | Grodzins | ...................... 378/57 |
| 6,554,557 | B1 | * | 4/2003 | Takehara et al. | ......... 414/140.3 |
| 6,698,990 | B1 | * | 3/2004 | Dobner et al. | ............ 414/139.9 |

FOREIGN PATENT DOCUMENTS

| DE | 10033141 A1 * | 1/2002 |
| JP | A 8-261958 | 10/1996 |
| JP | 09156769 A * | 6/1997 |
| JP | 11059910 A * | 3/1999 |
| JP | A 2002-362730 | 12/2002 |
| JP | A 2003-192140 | 7/2003 |
| JP | 2003252448 A * | 9/2003 |
| JP | A 2003-287507 | 10/2003 |
| JP | A 2003-292167 | 10/2003 |
| JP | 2004-203622 A | 7/2004 |
| WO | WO 9858861 A1 * | 12/1998 |

* cited by examiner

*Primary Examiner*—Gregory W Adams
(74) *Attorney, Agent, or Firm*—Oliff & Berridge, PLC (57) ABSTRACT

To provide a container inspection/cargo-handling system capable of efficiently inspecting import/export containers.

In order to solve the aforesaid problem, a container inspection/cargo-handling system of the present invention includes an automated guided vehicle (AGV) 18 that travels in circulation in a quay area. Further, on a circulation travel line of the AGV 18, provided are a quay crane 16 loading/unloading a container 14 to/from the AGV 18, a radiation inspection device 20 inspecting a cargo in the container 14 loaded on the AGV 18, and a container transfer means 22 for transferring the container 14 between the AGV 18 and a manned transport vehicle (container transport vehicle) 24.

8 Claims, 10 Drawing Sheets

CONTAINER INSPECTION/CARGO-HANDLING METHOD AND CONTAINER INSPECTION/CARGO-HANDLING SYSTEM

BACKGROUND OF THE INVENTION

1. Field of the Invention

The present invention relates to a container inspection/cargo-handling method and a container inspection/cargo-handling system, more particularly, to a container inspection/cargo-handling method and a container inspection/cargo-handling system which radiation-inspect a cargo in a container unloaded from a ship or a cargo in a container to be loaded on the ship, from the outside of the container on a cargo-handling route without unpacking the container.

2. Description of the Related Art

In recent years, such cases are increasing where socially ill goods such as guns and drugs or illegal goods different from goods declared by a cargo owner are hidden in import cargoes or export cargoes contained in containers. In order to disclose these goods, the inspection of container cargoes has come to be important in ports and harbors handling export/import cargoes.

As a device for inspecting container cargoes, there is, for example, an X-ray inspection device provided in a shielded room and making vehicles loaded with containers pass through the X-ray inspection device, thereby X-ray inspecting the container cargoes.

SUMMARY OF THE INVENTION

As for the aforesaid inspection device, the inspection of import cargoes is generally conducted under the setup such that a container transport vehicle (a manned transport vehicle) loaded with a container travels from a container terminal to an inspection ward outside the container terminal, and after the container is inspected in the ward, returns again to the container terminal. Therefore, container inspection efficiency was low and it was difficult to inspect all the import/export containers.

It is an object of the present invention to provide an inspection method and an inspection system of container cargoes which realize higher efficiency of container inspection and labor saving in cargo-handling/transfer works and enable efficient inspection of export/import containers.

In order to achieve the object stated above, in a container cargo inspection method according to the present invention, an automated guided vehicle moves in circulation in a quay area where a container ship anchors and transfers a container to/from the ship, and a container cargo on the automated guided vehicle is subjected to radiation inspection while the automated guided vehicle is moving in circulation. A possible structure in this case is that the automated guided vehicle circulates between a container stack yard and an area for container transfer to/from the ship, and the container cargo on the automated guided vehicle moving in circulation is subjected to the radiation inspection. Alternatively, the container may be transferred between the automated guided vehicle moving in circulation and a truck chassis.

The present invention may be a container inspection/cargo-handling method in which an automated guided vehicle circulates in a quay area to transfer a container to/from a ship, radiation inspection is conducted on a route of the circulation, and the container is transferrable between the automated guided vehicle moving in circulation and a truck chassis or an automated guided vehicle moving between the quay area and a container stack yard. A possible form in this structure is such that a circulation loop in the quay area and a circulation loop connecting the quay area and the container stack yard are provided, and the automated guided vehicle is capable of selecting one of the loops for transport.

Further, the present invention may be a container cargo inspection method for conducting radiation inspection of a cargo in a container unloaded from a ship or a cargo in a container to be loaded on the ship, wherein an automated guided vehicle moves in circulation in a quay area, and a loading/unloading work between the automated guided vehicle and the ship, the inspection of the container loaded on the automated guided vehicle, and a transfer work of the container between the automated guided vehicle and a manned transport vehicle are conducted on a circulation travel line of the automated guided vehicle. A possible structure is such that the container transfer work and the container loading/unloading work are conducted at least one place on the circulation travel line, and the number of places for the container inspection is set to one or a number less than the number of places for the container transfer work and the container loading/unloading work.

In a container inspection/cargo-handling system according to the present invention, a container crane installed in a quay area where a container ship anchors and a circulation route of an automated guided vehicle passing through a work area of the container crane are provided to enable transfer of a container between the container ship and the automated guided vehicle, and a radiation inspection device emitting radiation to a container cargo on the automated guided vehicle is provided along the circulation route. In this case, the circulation route may be a reciprocation/circulation route in the quay area. Further, a container transfer means may be provided on the circulation route to enable transfer of the container between a truck chassis and the automated guided vehicle. Another possible structure is such that a container transfer means is provided on the circulation route, a second automated guided vehicle to/from which the transfer means transfers the container is provided, and the second automated guided vehicle is capable of circulating and transporting the container between a container stack yard and the quay area.

Further, a container inspection/cargo-handling system according to the present invention may be structured such that a container crane installed in a quay area where a container ship anchors and a circulation route of an automated guided vehicle, which passes through a work area of the container crane to reach a container stack yard, are provided to enable transfer of a container between the container ship and the automated guided vehicle and enable transport of the container to the container stack yard, and a radiation inspection device emitting radiation to a container cargo on the automated guided vehicle is provided along the circulation route. A possible form in this structure is such that the circulation route is composed of a quay area loop and a connecting loop including a part common to the quay area loop and connecting the quay area and the container stack yard, and the radiation inspection device is provided on the quay area loop or the common loop. Another possible structure is such that the circulation route is composed of a quay area loop and a connecting loop including a part common to the quay area loop and connecting the quay area and the container stack yard, and the quay area loop is a switchback-type reciprocation and circulation route. Another possible structure is such that the circulation route is composed of an automated guided vehicle circulation loop in the quay area and a connecting circulation loop connecting the quay area and the container stack yard, and a container transfer crane transferring the container between the both loops is equipped.

Further, the present invention may be a container cargo inspection system for conducting radiation inspection of a cargo in a container unloaded from a ship or a cargo in a container to be loaded on the ship, wherein an automated guided vehicle traveling in circulation in a quay area is provided, and on a line on which the automated guided vehicle travels in circulation, provided are: a cargo handling means for loading/unloading the container to/from the automated guided vehicle; a container inspecting means for inspecting the cargo in the container loaded on the automated guided vehicle; and a container transfer means for transferring the container between the automated guided vehicle and a manned transport vehicle. A possible form in this structure is such that the number of the cargo handling means and the number of the container transfer means installed on the line on which the automated guided vehicle travels in circulation is at least one, and the number of the container inspecting means installed on the line on which the automated guided vehicle travels in circulation is one or a number less than the number of the cargo handling means and the container transfer means.

According to the present invention as structured above, the automated guided vehicle travels in circulation only in the quay area or between the quay area and the container stack yard, the loading/unloading work between the automated guided vehicle and the ship is conducted on the circulation travel line of the automated guided vehicle, the radiation inspection work of the container loaded on the automated guided vehicle is conducted on the same circulation travel line, and the transfer work of the container to/from the circulation travel line is conducted between the automated guided vehicle and the manned transport vehicle or an automated guided vehicle, so that efficient container cargo inspection is enabled. Further, the transport vehicle traveling in circulation in the quay area is automated, which makes it possible to eliminate a waste for a driver to get on/off at the time of the container inspection and to save labor cost and the like corresponding to the waiting time occurring in each process.

Further, the container transfer work and the container loading/unloading work are conducted in at least one place on the circulation travel line, and the number of places for the container inspection is set to one or the number less than the number of places for the container transfer work and the container loading/unloading work, so that efficient container inspection is enabled with reduced number of places for installation of the expensive inspection device.

By providing a transport line of the chassis together with the circulation line to conduct the transfer, or by separately forming a circulation line leading to the container stack yard to enable the container transport between the yard and the quay area by the automated guided vehicle, a full-automatic system is realized. Needless to say, if a common line shared by the circulation travel line in the quay area and the circulation travel line leading to the container stack yard is provided to thereby form a continuous travel line and the automated guided vehicle travels thereon, it is possible to realize a system capable of conducting the radiation inspection of the container cargo while realizing the full-automatic line, which enables extremely high efficiency.

DESCRIPTION OF THE PREFERRED EMBODIMENTS

Hereinafter, embodiments according to a container inspection/cargo-handling method and inspection/cargo-handling system of the present invention will be described with reference to the drawings. It should be noted that the embodiments shown below are part of embodiments according to the present invention, and a partly changed embodiment is also included in the present invention, providing that an essential part of the invention is not changed.

Figure 1:
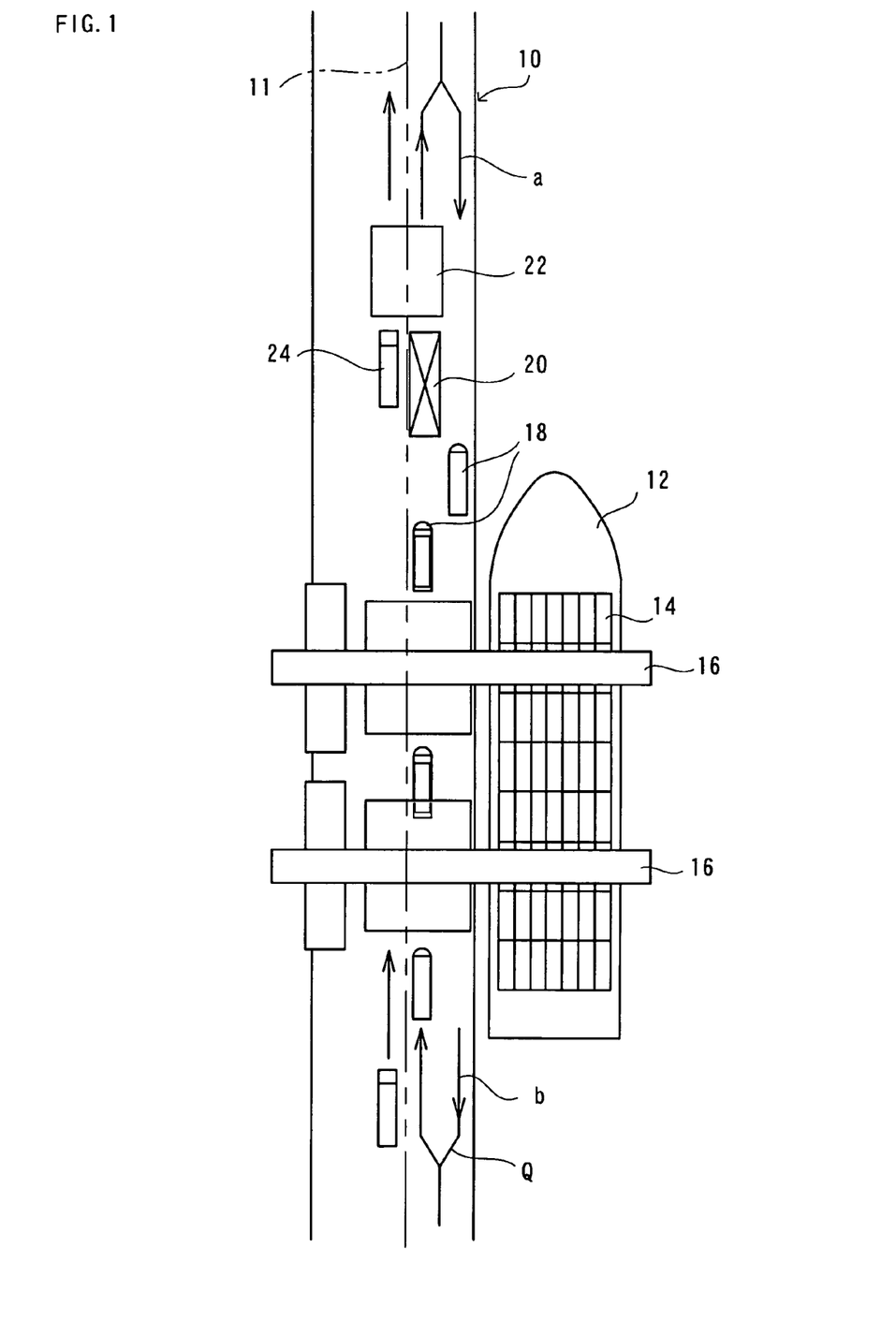
[FIG. 1] is a view showing an embodiment according to a container inspection/cargo-handling system of the present invention.

FIG. 1 is a schematic entire view showing a first embodiment according to the container inspection/cargo-handling method and inspection/cargo-handling system of the present invention.

The basic configuration of this embodiment includes: automated guided vehicles (hereinafter, referred to as AGV) 18 traveling in circulation in a quay area 10 of a port; quay cranes 16 as cargo-handling means provided on a travel line of the AGVs 18 to load/unload containers 14 to/from the AGVs 18; a radiation inspection device 20 as a container inspecting means; a container transfer means 22; and a container transport vehicle (manned transport vehicle, hereinafter, referred to as a truck chassis) 24 to which the containers 14 are transferred from the AGVs 18 by the container transfer means 22. Note that the AGV 18 used in this embodiment is not limited to a specific one, providing that it is capable of transporting the container 14.

In this embodiment thus configured, the AGV 18 is set to be capable of moving in reciprocation and circulation in a quay area 10 on a quay circulation travel line Q provided along a quay. In particular, in this embodiment, the circulation travel line Q is set so that the AGVs 18 travel in circulation while changing their routes by switchback, as shown by the arrows a, b. Needless to say, it may be set so that the AGVs 18 make a U-turn, but the method described above is more suitable in the quay area 10 in which travel space is limited. Another possible method is semi-circulation travel so that the AGVs 18 travel in reciprocation, and in this case, if the vehicles come close to each other, at least one of them changes its travel line, thereby preventing the contact of the vehicles. The traveling of the AGVs 18 and the track chassis 24 in the quay area 10 together not only complicates the control over the AGVs 18 but also may possibly cause an unnecessary accident by human failure. Therefore, it is desirable to provide a fence 11 in the quay area 10 to separate a travel lane of the AGVs 18 and a travel lane of the truck chassis 24.

Figure 2:
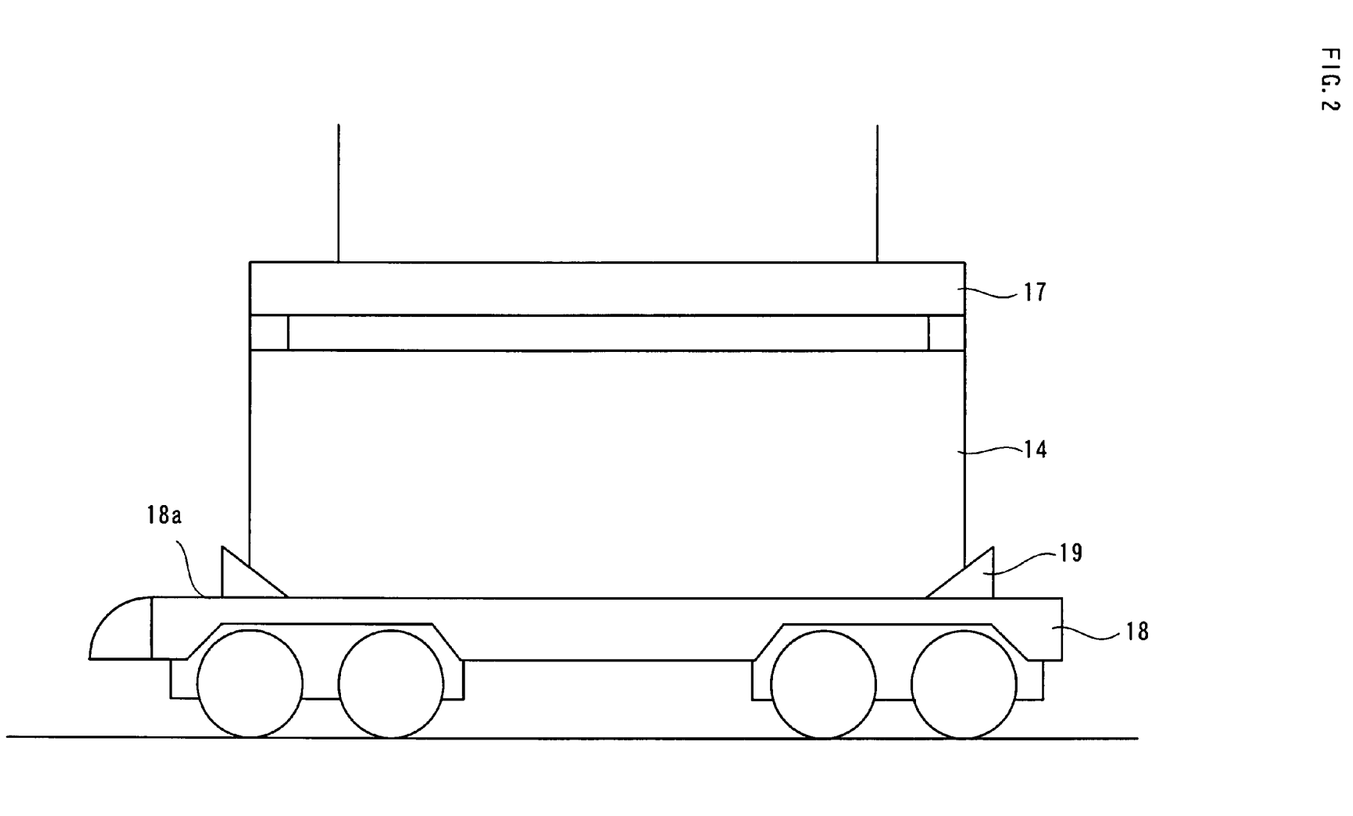
[FIG. 2] is a view showing a state of a cargo-handling work under a quay crane.

As shown in detail in FIG. 2, each of the quay cranes 16 installed on the circulation route of the AGVs 18 traveling in circulation as described above unloads the container 14, which is slung up via a spreader 17, into a bed part 18a of the AGV 18 that has stopped in a lower frame part of the quay crane 16. At this time, for a quick, safe, and accurate unloading work, preferably, a guide 19 is provided in a container loading position of the bed part 18a of the AGV 18, thereby enabling automatic correction of slight deviation and error at the time of the container loading.

Figure 3:
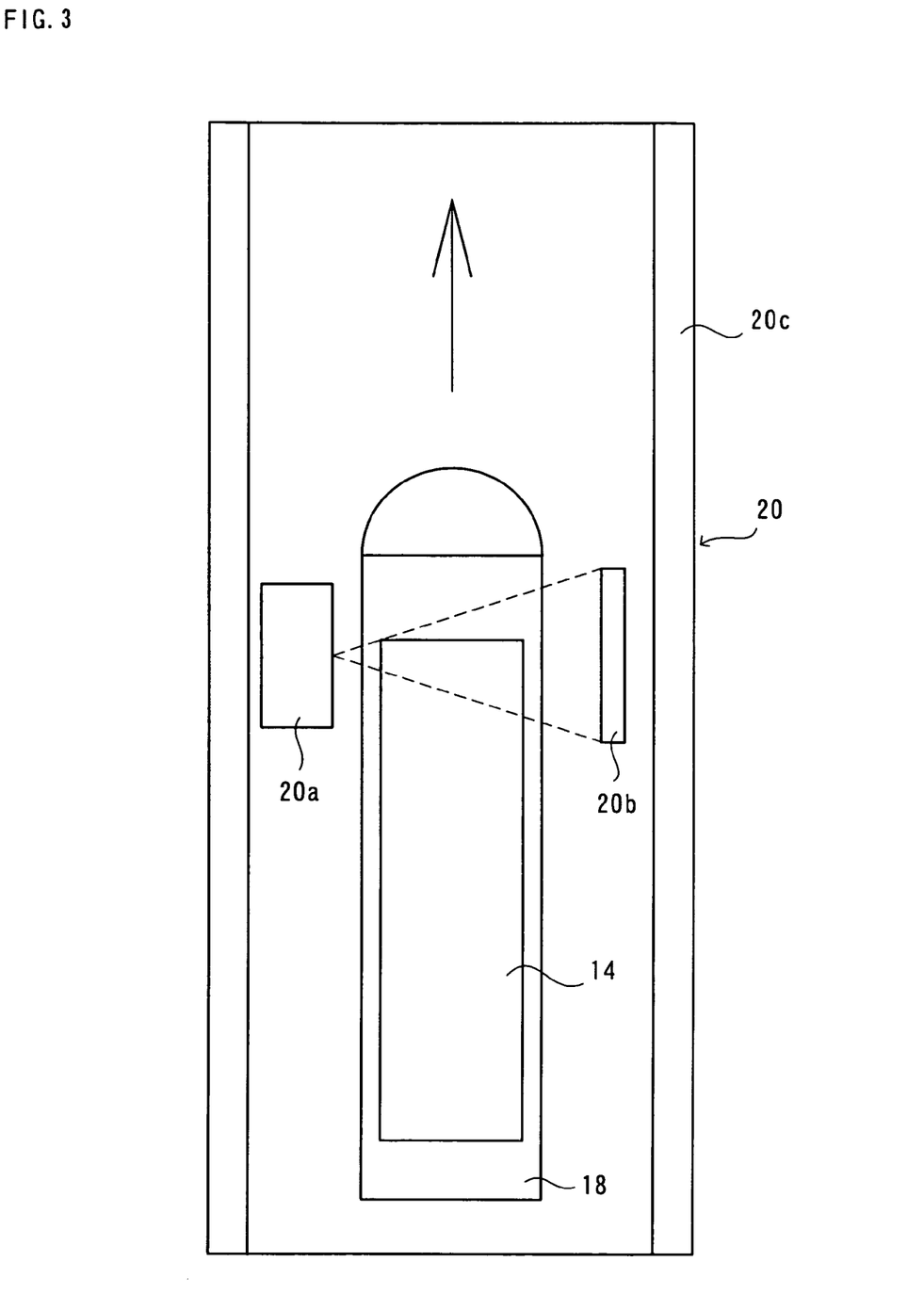
[FIG. 3] is a plane view showing a radiation inspection device and an AGV passing through the radiation inspection device.

Next, the radiation inspection device 20 installed on the circulation route will be described with reference to FIG. 3. The radiation inspection device 20 has therein a radiation source 20a emitting radiation and a detection part 20b detecting the radiation emitted from the radiation source. The radiation source 20a and the detection part 20b are arranged apart from each other across an interval large enough to allow the AGV 18 to pass between the both, and when the AGV 18 passes between the both, a cargo in the container 14 loaded on the AGV 18 is subjected to radiation inspection. Further, for safety, the radiation inspection device 20 preferably includes a casing 20c covering at least a radiation-exposed area with a radiation shielding material. Further, though not shown, the radiation inspection device 20 preferably includes a not-shown tire so as to be movable to an arbitrary position.

Figure 4:
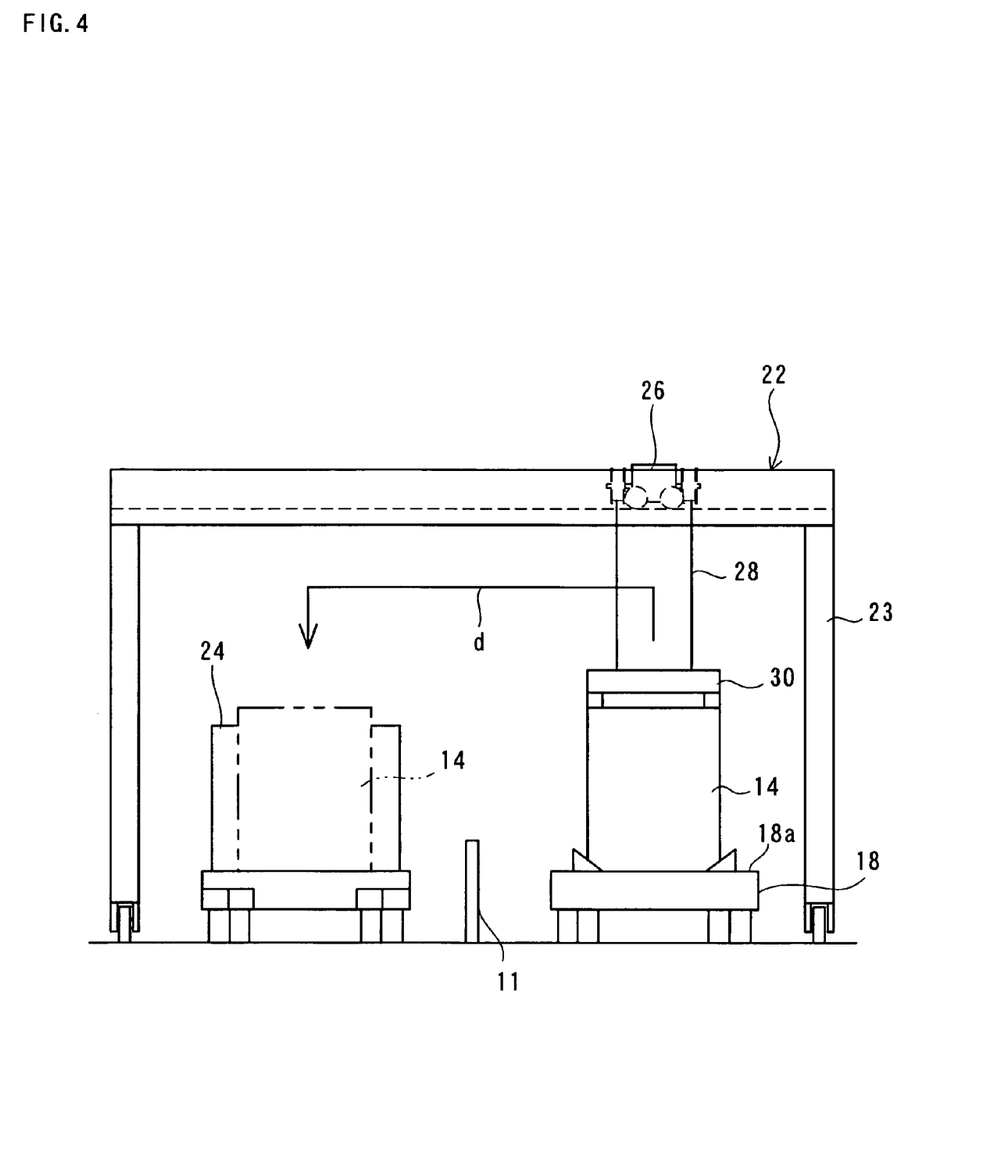
[FIG. 4] is a front view showing a container transfer means.

Next, the container transfer means 22 installed on the circulation route will be described with reference to FIG. 4. The container transfer means 22 is constituted of a gate-shaped frame 23 including a laterally movable trolley 26, and is capable of hoisting a spreader 30 via a wire 28. The container transfer means 22 thus structured slings up the container 14 by connecting the spreader 30 to the container 14 loaded on the AGV 18 stopping at a stop position. The container 14 which is slung up is moved along a route shown by the arrow d to be transferred to the truck chassis 24 stopping on a container transport vehicle lane. Further, the container transfer means 22 desirably has a tire so as to be movable to an arbitrary position.

Incidentally, as the container transfer means 22, any means such as a transfer crane, a forklift, a reach stacker, a top lifter, or the like is usable. The same applies hereinafter.

The AGVs 18 traveling on the circulation route may receive a command sequentially from a not-shown control part provided in the port, may travel on the circulation route at pre-programmed timing and speed, or may trace sensors or the like buried on the route to receive instructions therefrom.

The quay cranes 16, the radiation inspection device 20, and the container transfer means 22 may be centrally controlled by the not-shown control part, but from a safety point of view, they are desirably operated by operators allocated to the individual machines since the loading/unloading and so on of containers require manpower.

In this embodiment as configured above, the travel route of the AGVs 18 is first determined. The travel route of the AGVs 18 is preferably a circulation route passing through unloading positions (in the lower frame parts) of the quay cranes 16. Next, the radiation inspection device 20 and the container transfer means 22 are arranged at arbitrary positions on the circulation route.

In the lower frame part of the quay crane 16, the unloaded container 14 is loaded to the bed part 18a of the AGV 18 traveling on the determined circulation route. The AGV 18 loaded with the container 14 travels on the circulation route and directly moves into the radiation inspection device 20. Inside the radiation inspection device 20, the AGV 18 which is controlled at a fixed traveling speed passes between the radiation source 20a and the detection part 20b. Consequently, the container 14 loaded on the AGV 18 is inspected along a longitudinal direction. Specifically, the radiation is emitted toward the container 14 from the radiation source 20a of the radiation inspection device 20. The radiation is attenuated in the course of transmitting through an outer wall of the container 14 and the cargo in the container, and the attenuated transmitted radiation is detected by the detection part 20b. The detection part 20b converts the detected radiation into an electric signal to output it to a not-shown image processing device. The image processing device processes the electric signal to display on a not-shown monitor an image regarding the cargo in the container 14. The image displayed on the monitor is checked by an operator whether or not the container 14 contains goods obviously different from those written in a cargo list declared by a cargo owner.

The cargo can be checked also by the following method. Specifically, a database is provided in the radiation inspection device 20, and an expected amount of the transmitted radiation corresponding to the cargo in the container 14 being an inspection target is set in advance. Regarding the container 14 inspected by such a radiation inspection device 20, if an amount of the transmitted radiation is greatly different from the expected amount, a warning or the like is rung. The container 14 causing the warning to ring is sent to additional detailed inspection. This saves manpower and also improves inspection speed.

Having passed through the radiation inspection device 20, the AGV 18 loaded with the container 14 having undergone the inspection described above travels up to a stop position set for the container transfer means 22 to stop there. The spreader 30 is connected to the container 14 loaded on the bed part 18a of the stopping AGV 18 to sling up the container 14. The container 14 which is slung up is carried along the route of the arrow d to be transferred across the fence 11 to the truck chassis 24 stopping on the container transport vehicle lane.

The AGV 18 from which the container 14 is transferred to the container transfer means 22 travels in circulation along the determined route to move into the lower frame part of the quay crane 16 again.

Needless to say, a container confirmed as normal and a container confirmed as abnormal by the radiation inspection are subjected to different processes in and after the transport by the container transport vehicle 24.

Generally, in the radiation inspection device, an idling time occurs after the end of the container inspection until a new container is carried. thereto. In the container cargo inspection system as described above, one radiation inspection device 20 and one container transfer means 22 are provided for the plural (two in this embodiment) quay cranes 16 as shown in FIG. 1, so that containers unloaded from the plural quay cranes 16 are successively inspected, and the idling time can be thus eliminated to enable efficient container inspection, which realizes effective use of the relatively expensive radiation inspection devices 20.

The radiation inspection device 20 of the above-described embodiment adopts an X-ray as the radiation in use. Being highly transmissive, the X-ray is especially effective in the present invention in which the transmission of the radiation through the outer wall iron plate of the container is essential, and preferably, an X-ray with a high energy of about 6 to 9 MeV is used. However, the radiation used in the present invention may be a γ ray or the like. Further, the radiation inspection device may be a passive sensor such as a neutron detector detecting a fissionable material or may be one structured by complex combination of these.

It is written in the embodiment described above that the gate-shaped transfer crane including the trolley is used as the container transfer means. However, the container transfer means according to the present invention may be one such as a forklift, providing that it is capable of transferring the container from the AGV to the container transport vehicle, as previously described. In this case, a not-shown fork pocket provided in the lower part of the container is suitably used.

The above embodiment has described the case where the container 14 is unloaded from the ship 12, but the container cargo inspection system of the present invention is also usable in a case where a container is loaded on a ship. In this case, the transport processes of the container 14 proceed in reverse order to the above. That is, the container 14 transported to the container transfer means 22 by the truck chassis 24 is transferred to the AGV 18. The container 14 transferred to the AGV 18 passes through the radiation inspection device 20 to be transported into the lower frame part of the quay crane 16 and loaded on the ship 12. Note that a container confirmed as abnormal by the radiation inspection device 20 is sent to processes different from those described above.

The above embodiment has described the case where the loading and unloading of the container are separately done, but the container cargo inspection method and system of the present invention are applicable to a case where the loading and unloading progress simultaneously. In this case, the container transfer means 22 is preferably divided into a container transfer means 22a for loading and a container transfer means 22b for unloading as shown in a second embodiment in FIG. 5. When such a form is adopted, a container for loading transported by the container transport vehicle 24 is transferred to the AGV 18 by the container transfer means 22a for loading. The container for loading transferred to the AGV 18 is subjected to the radiation inspection by the radiation inspection device 20. The AGV 18 whose container for loading has undergone the radiation inspection passes through the container transfer means 22b for unloading and takes the route a to transport the container for loading into the lower frame part of the quay crane 16. On the other hand, the container for unloading unloaded from the ship to the AGV 18 is subjected to the radiation inspection by the radiation inspection device 20. The container for unloading after the inspection is transferred to the truck chassis 24 by the container transfer means 22b for unloading.

Figure 5:
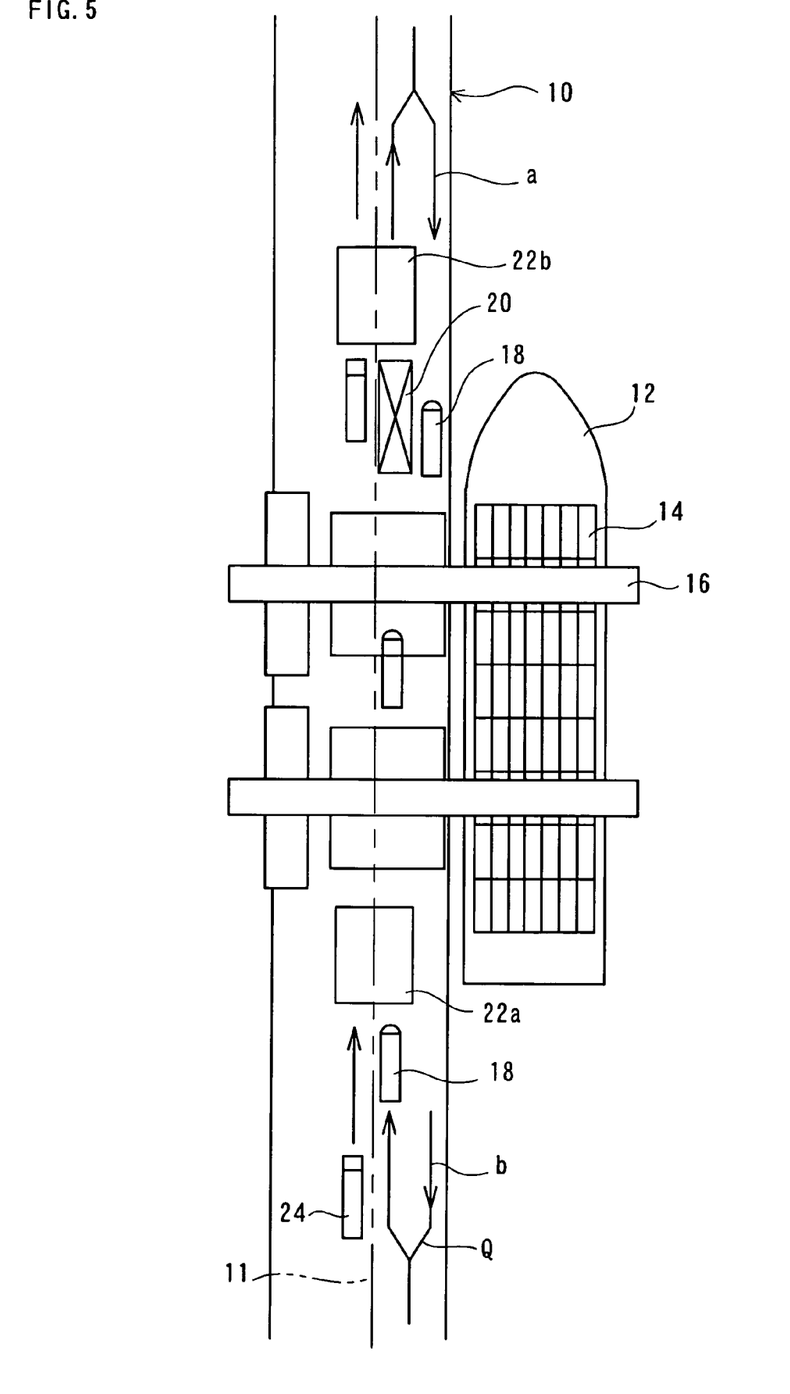
[FIG. 5] is a view showing a second embodiment in embodiments according to the container inspection/cargo-handling system of the present invention.

Consequently, the container transport vehicle 24 from which the container 14 is transferred by the container transfer means 22a for loading can receive the container 14 from the container transfer means 22b for unloading, which enables efficient loading/unloading and transport work of containers. It goes without saying that a loading circulation route and an unloading circulation route may be separately provided and the radiation inspection device 20 and the container transfer means 22 may be provided on each of the routes.

Another possible structure is to set the loading route and the unloading route of containers so that the AGVs 18 travel in two directions (in opposite directions). In this case, if the vehicles come close to each other, at least one of them changes its travel line to prevent the contact of the vehicles.

The above embodiments have described the case where the two quay cranes 16 are provided for loading and unloading, but structures in which the number of the quay cranes 16 is increased/decreased depending on the size and the like of the ship 12 are also included as embodiments of the present invention. Similarly, the number of the container transfer means 22 is not limited to one or two, and may be a plural number. Further, the installation number of the radiation inspection devices 20 may also be arbitrary, but providing a less number of the expensive radiation inspection devices 20 than the number of the quay cranes 16 and the container transfer means is more economical.

Further, in the above-described embodiments, the cargo-handling means is the quay crane, but the cargo-handling means according to the present invention is not limited to the quay crane.

FIG. 6 to FIG. 9 show a third embodiment to a sixth embodiment.

Figure 6:
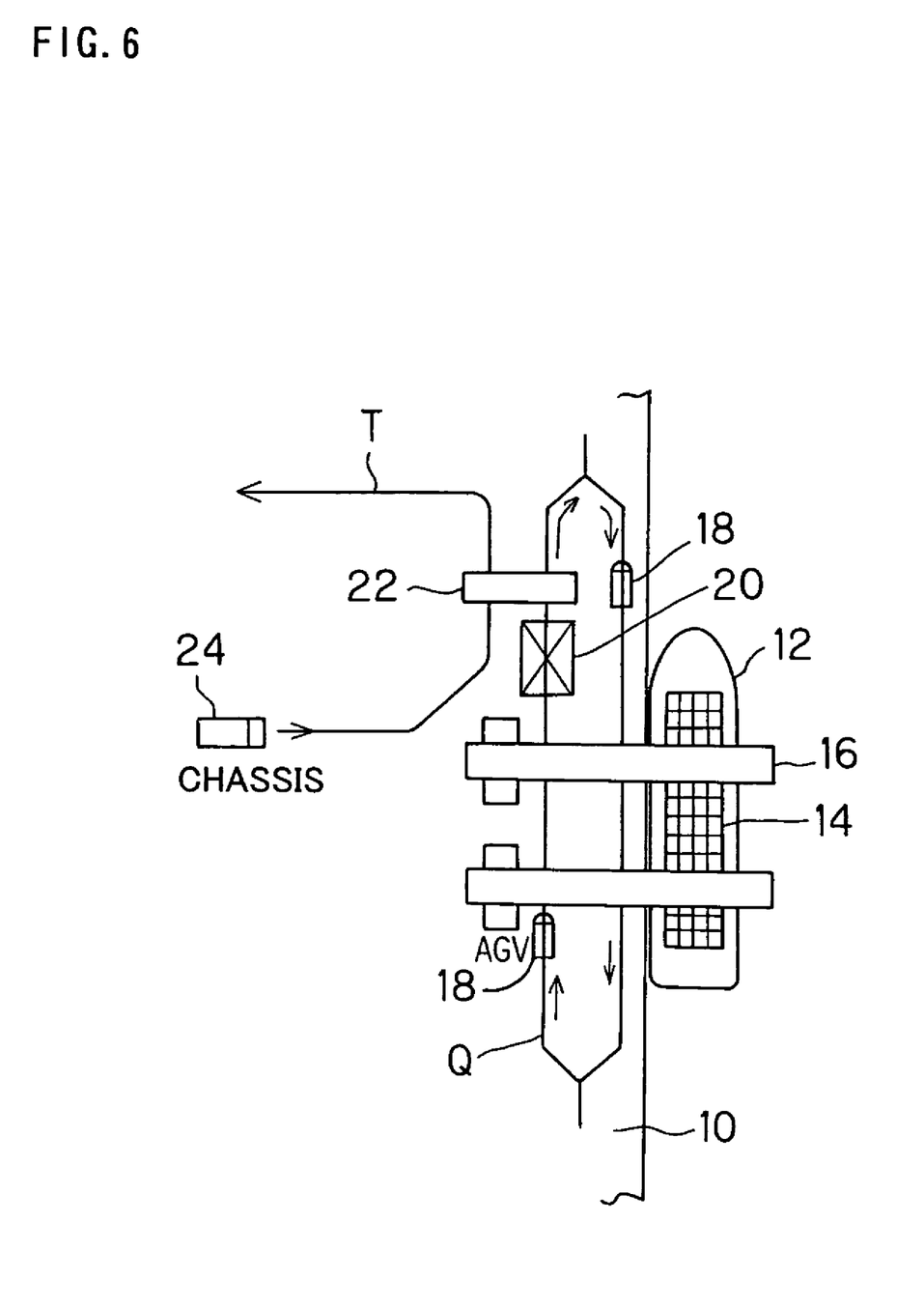
[FIG. 6] is a configuration view showing a third embodiment of the container inspection/cargo-handling system according to the present invention.

In an example of the third embodiment shown in FIG. 6, a truck chassis 24 does not travel in a quay area 10 but a container is transferred thereto by a container transfer means 22 disposed on part of a quay circulation travel line Q. Specifically, AGVs 18 move in circulation along the quay circulation travel line Q in the quay area 10 where a container ship 12 anchors, to transfer a container 14 to/from the ship 12, and the container-loaded AGV 18 passes through a radiation inspection device 20 installed on the circulation route, whereby a container cargo on the AGV 18 undergoes the radiation inspection during the passage. The container transfer means 22 is provided ahead of the radiation inspection device 20, through which a transport line T of the truck chassis 24 passes, so that the container 14 is transferred between the AGV 18 moving in circulation and the truck chassis 24. The truck chassis moves in reciprocation to/from a container stack yard for container transport. This structure makes it possible to conduct the radiation inspection of an import container on the circulation travel line Q in the quay area 10 while the import container is kept loaded on the AGV 18, which eliminates a need for container transport to another area for the inspection, so that an efficient container cargo-handling work is realized.

Figure 7:
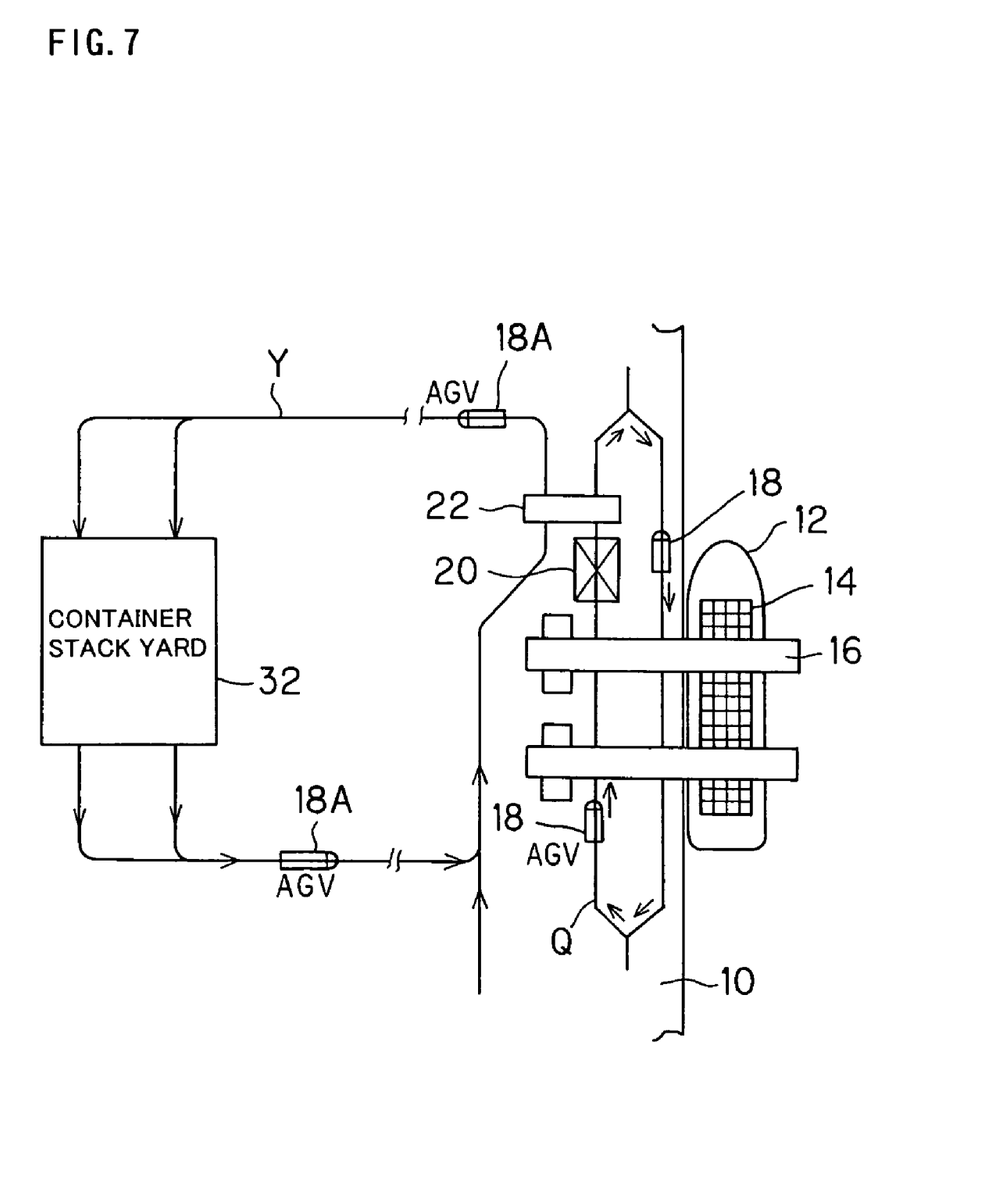
[FIG. 7] is a configuration view showing a fourth embodiment of the container inspection/cargo-handling system according to the present invention.

FIG. 7 relates to a fourth embodiment, in which a yard connection/circulation travel line Y connecting with a container stack yard 32 is provided instead of the transport line T for the truck chassis 24 of the third embodiment shown in FIG. 6, and second AGVs 18A travel in circulation thereon. A loop of the yard connection/circulation travel line Y and a loop of a quay circulation travel line Q connect with each other in a container transfer means 22 part provided ahead of a radiation inspection device 20, enabling container transfer between the loops. According to this embodiment, the entire process from loading/unloading of containers to housing of the containers in the yard can be automated.

Figure 8:
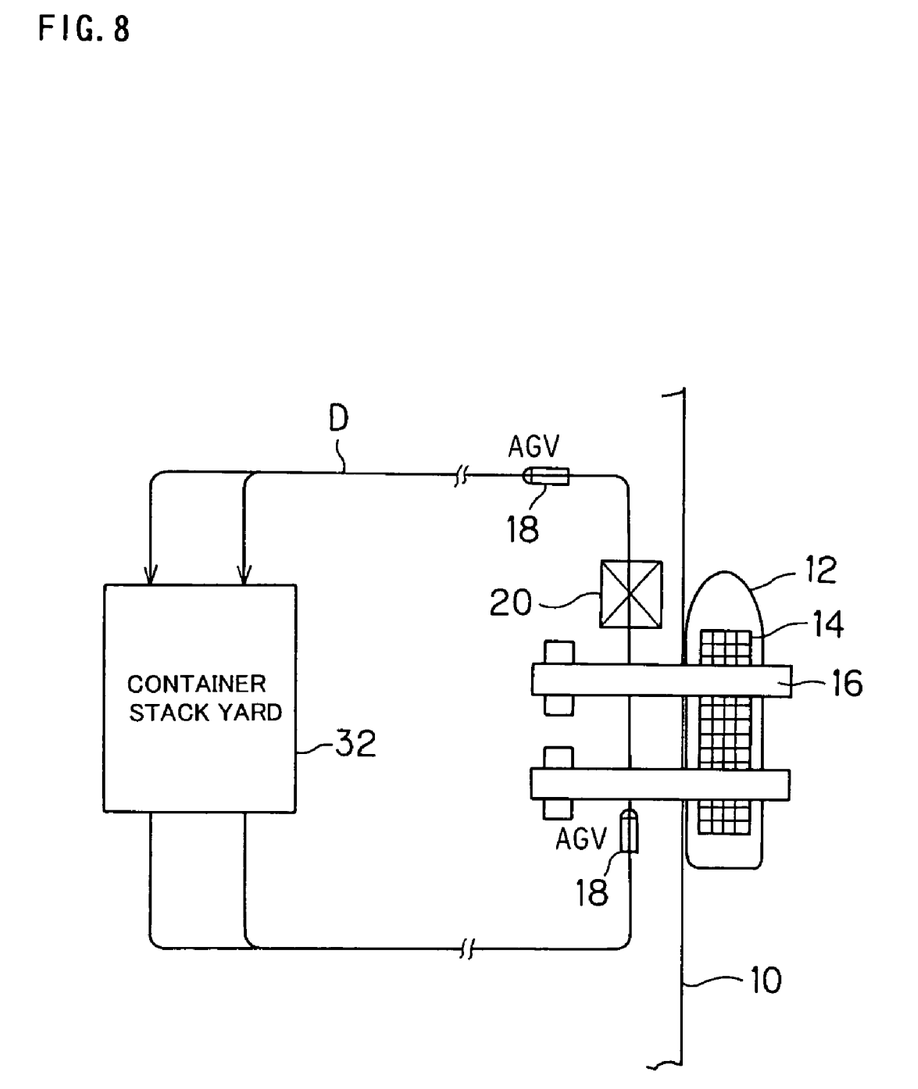
[FIG. 8] is a configuration view showing a fifth embodiment of the container inspection/cargo-handling system according to the present invention.
Figure 10:
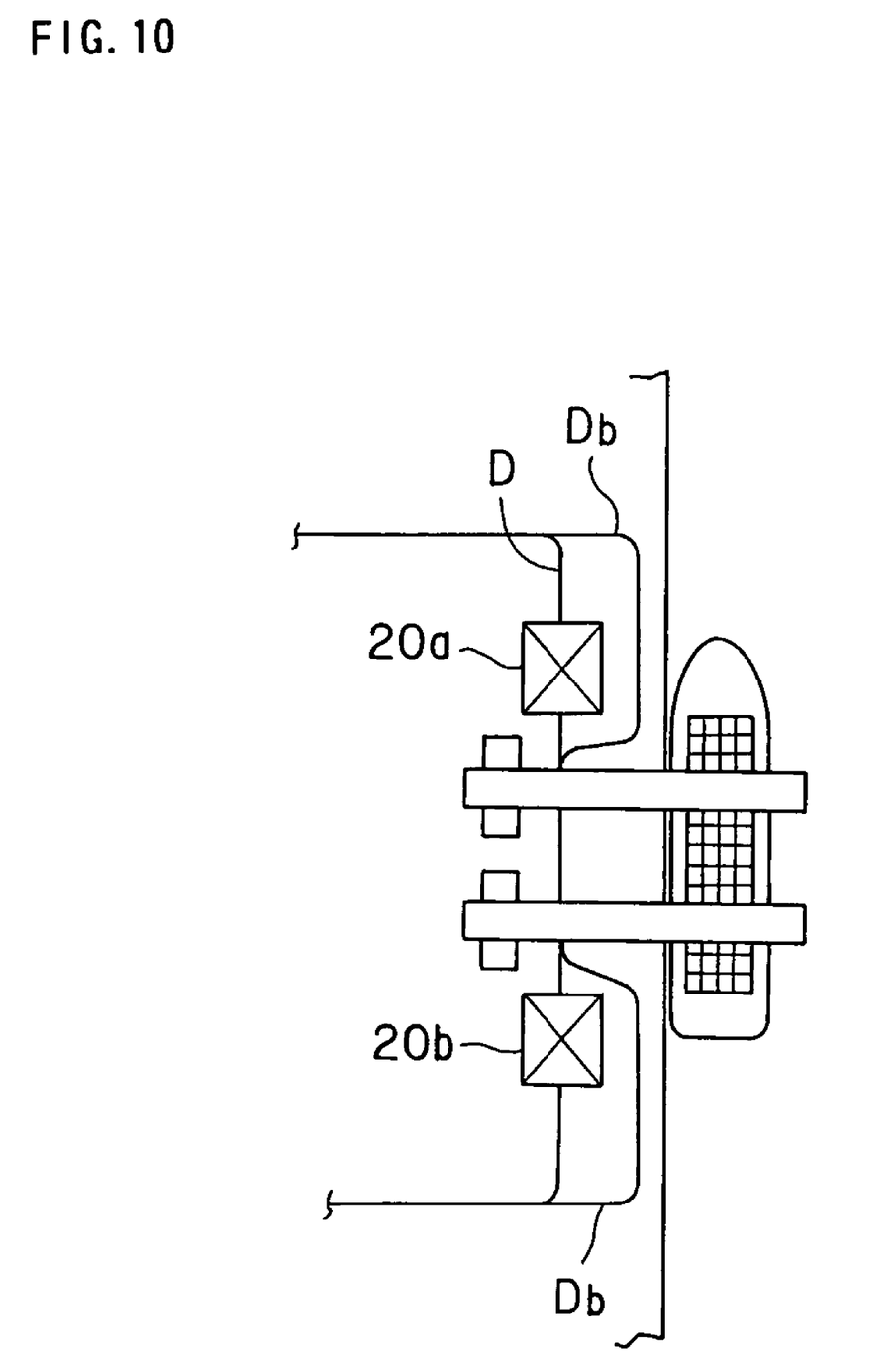
[FIG. 10] is a partial configuration view showing a seventh embodiment of the container inspection/cargo-handling system according to the present invention.

FIG. 8 shows still another embodiment, in which without providing an independent circulation travel line Q in a quay area 10, a direct circulation travel line D directly connecting the quay area 10 and a container stack yard 32 is provided, whereby AGVs 18 move in circulation between the quay area 10 and the container stack yard 32. Each of the AGVs 18 passes through a radiation inspection device 20 in the quay area 10 of the travel line D, whereby the inspection of a container cargo is conducted automatically. In this structure, an import container 14 is subjected to the radiation inspection after being unloaded, but since an export container cannot be subjected to the radiation inspection before it reaches a quay crane 16, it is desirable that the radiation inspection device 20 is of a movable type and is moved and located short of the quay crane 16 for inspecting the export container. Alternatively, the direct circulation travel line D may be structured so that the circulation direction is switchable between forward and reverse directions, depending on the cargo-handling of the export container or the cargo-handling of the import container. Moreover, providing radiation inspection devices 20a, 20b ahead of and at the back of the quay cranes 16 on the circulation line D as shown in FIG. 10 enables simultaneous radiation inspections at the time of the cargo-handling of the export and import containers without the aforesaid movement or switching, which realizes efficient operation. It is more preferable that routes Db bypassing the radiation inspection devices 20a, 20b are provided in the circulation line D. This structure makes it possible for the AGV 18 traveling on the single circulation travel line D to perform the loading/unloading work of the container 14 to/from the ship 12 and the transport of the container 14 to/from the container stack yard 32, so that the container transfer means 22 can be dispensed with, realizing great improvement in work efficiency.

Figure 9:
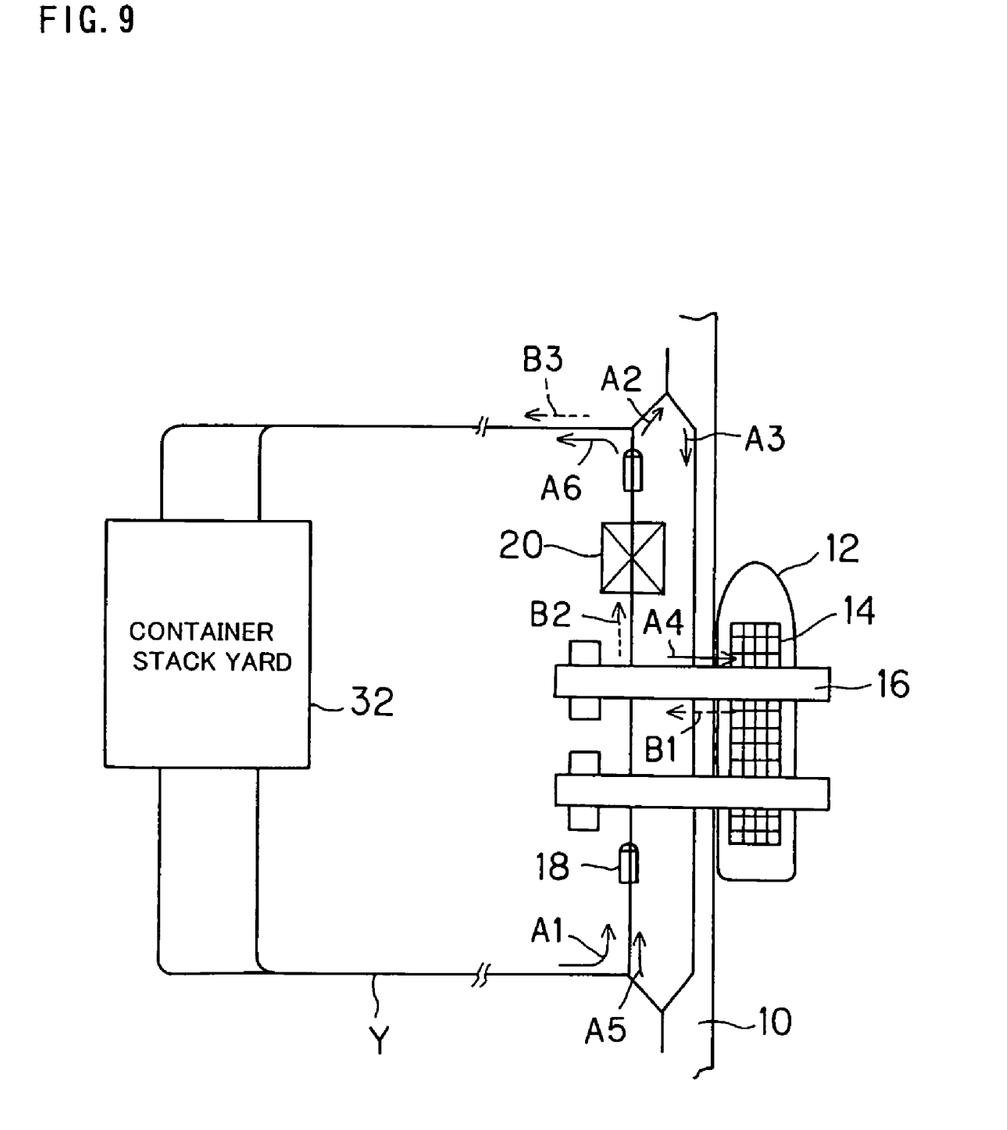
[FIG. 9] is a configuration view showing a sixth embodiment of the container inspection/cargo-handling system according to the present invention.

FIG. 9 is a route view showing another embodiment. This embodiment is a facility in which the quay circulation travel line Q and the yard connection/circulation travel line Y are combined, and part of loops of the both lines Q, Y is set as a common line QY. AGVs 18 travel on this complex circulation travel line for the cargo-handling work and the inspection work. That is, areas for cargo-handling work by quay cranes 16 and a radiation inspection device 20, which is provided on a downstream side of the cargo-handling work area, are set on the common line QY part of the quay circulation travel line Q, whereby an inspection area part is provided. In such an embodiment, cargo-handling processes for an export container and those for an import container are different. First, in the cargo-handling work for the export container, a container 14 is transported on the yard connection/circulation travel line Y by the AGV 18 from a container stack yard 32 toward a quay. Then, the AGV 18 first enters the common line QY (arrow A1), passes through the radiation inspection device 20 for inspection, enters a switchback route (arrow A2), and enters a reverse transport route (A3), and then unloading to the ship 12 is performed by the quay crane 16, whereby the work is finished. The unloaded AGV 18 moves in a downward direction in the drawing to make a switchback (arrow A5) and then is used for the import work described below or travels on the common line QY and enters the yard connection/circulation travel line Y (arrow A6) to return to the container stack yard 32. On the other hand, in the case of the cargo-handling work for the import container, the AGV 18 on the common line QY is loaded with the import container from the ship 12 by the quay crane 16 (arrow B1). The AGV 18 loaded with the container 14 travels to enter the radiation inspection device 20 (arrow B2), and after undergoing the inspection of the loaded cargo therein, enters the yard connection/circulation travel line Y (arrow B3), and travels toward the container stack yard 32, and then the container is unloaded to the yard. In this manner, in this embodiment, the travel line of the AGV 18 is selected depending on whether the work is for the import of the container 14 or the export of the container 14, so that it is possible to inspect the container cargo at an optimum position only by making the AGVs 18 travel on the cargo-handling work route without moving the radiation inspection device 20, resulting in extremely high work efficiency. The container loading route and unloading route are set so that the AGVs 18 travel in two directions (opposite directions). In this case, if the vehicles come close to each other, at least one of them changes its travel line to prevent the contact of the vehicles.

Incidentally, though not shown, in order to effectively utilize the radiation inspection device 20, if in the container stack yard 32, there is a container not having undergone the inspection when the ship 12 is not anchored, the truck chassis 24 or the AGV 18 is sent thereto on the circulation loop to allow the container 14 to be subjected to the radiation inspection at a stage before it is loaded on the ship 12, which realizes more efficient use of the system.

As described above, the present invention can be utilized in a container cargo-handling work system that performs the loading/unloading work of a container to/from a ship and conducts radiation inspection of a container cargo.

What is claimed is:

1. A container inspection/cargo-handling method, comprising:
moving a container on an automated guided vehicle or a truck chassis in circulation along a first circulation route that is only in a quay area where a container ship anchors and where the container is transferred to/from the ship;
subjecting the container to radiation inspection while the container is moving in circulation along the first circulation route in the quay area;
moving the container in circulation along a second circulation route between the quay area and a container stack yard where the container is stored, wherein the container is moved from the quay area to the container stack yard after subjecting the container to the radiation inspection in the quay area, and the container is transferred between the automated guided vehicle or the truck chassis moving in circulation along the first circulation path and another automated guided vehicle or truck chassis that moves along the second circulation path; and
subjecting the container to the radiation inspection when the automated guided vehicle or the truck chassis, loaded with the container received from the container stack yard, is moving in circulation along the first circulation route in the quay area, wherein the container is transferred to the ship after the radiation inspection.

2. A container inspection/cargo-handling method for conducting radiation inspection of cargo in a container unloaded from a ship or cargo in a container to be loaded on the ship, comprising:
moving an automated guided vehicle or a truck chassis along a first circulation route that is only in a quay area,
loading/unloading the container between the automated guided vehicle or the truck chassis and the ship, and
conducting the radiation inspection of the container loaded on the automated guided vehicle or the truck chassis, while the container is moving in circulation along the first circulation route in the quay area, wherein the container is moved from the quay area to a container stack yard along a second circulation route or from the quay area to the ship after subjecting the container to the radiation inspection in the quay area, and the container is moved from the quay area to the container stack yard or from the quay area to the ship at least at one place on the first circulation route, and a number of places for the radiation inspection is set to one or a number less than a number of places for the transfer from the quay area to the container stack yard or from the quay area to the ship.

3. A container inspection/cargo-handling system, comprising:
a container crane installed in a quay area where a container ship anchors;
a first circulation route of an automated guided vehicle or a truck chassis passing through a work area of the container crane, wherein the container crane and the first circulation route enable transfer of a container between the container ship and the automated guided vehicle or the truck chassis, and the automated guided vehicle or the truck chassis moves in circulation along the first circulation route that is only in the quay area;

a radiation inspection device emitting radiation to the container on the automated guided vehicle or truck chassis provided along the first circulation route in the quay area; and a second circulation route, wherein the container moves in circulation along the second circulation route between the quay area and a container stack yard where the container is stored, and the container moves from the quay area to the container stack yard after subjecting the container to the radiation inspection in the quay area, and wherein the first circulation route is composed of a quay area loop and a connecting loop including a part common to the quay area loop and connecting the quay area and the container stack yard, the radiation inspection device is provided on the quay area loop or the common loop, and the quay area loop is a switchback-type reciprocation and circulation route.

4. The container inspection/cargo-handling system according to claim 3, wherein a container transfer means is provided on the first circulation route to enable transfer of the container between another automated guided vehicle or truck chassis and the automated guided vehicle or the truck chassis.

5. The container inspection/cargo-handling system according to claim 3, wherein a container transfer means is provided on the first circulation route, another automated guided vehicle or truck chassis to/from which the transfer means transfers the container is provided, and the another automated guided vehicle or truck chassis is capable of circulating and transporting the container between the container stack yard and the quay area.

6. A container inspection/cargo-handling system, comprising:

a container crane installed in a quay area where a container ship anchors:

a first circulation route of an automated guided vehicle or a truck chassis, which passes through a work area of the container crane to reach a container stack yard, wherein the container crane and the first circulation route enable transfer of the container between the container ship and the automated guided vehicle or the truck chassis and enable transport of the container to the container stack yard, and the automated guided vehicle or the truck chassis moves in circulation along the first circulation route that is only in the quay area;

a radiation inspection device emitting radiation to the container on the automated guided vehicle or the truck chassis provided along the first circulation route in the quay area; and a second circulation route, wherein the container moves in circulation along the second circulation route between the quay area and the container stack yard where the container is stored, and the container moves from the quay area to the container stack yard after subjecting the container to the radiation inspection in the quay area, and wherein the first circulation route is composed of a quay area loop and a connecting loop including a part common to the quay area loop and connecting the quay area and the container stack yard, the radiation inspection device is provided on the quay area loop or the common loop, and the quay area loop is a switchback-type reciprocation and circulation route.

7. A container inspection/cargo-handling system for conducting radiation inspection of cargo in a container unloaded from a ship or cargo in a container to be loaded on the ship, comprising:

a first circulation route that is only in a quay area;

an automated guided vehicle or truck chassis traveling in circulation along the first circulation route;

on a line on which the automated guided vehicle or the truck chassis travels in circulation along the first circulation route, provided are:

a cargo handling means for loading/unloading the container to/from the automated guided vehicle or the truck chassis;

a container inspecting means for inspecting the cargo in the container loaded on the automated guided vehicle or the truck chassis; and a container transfer means for transferring the container between the automated guided vehicle or the truck chassis and another automated guided vehicle or truck chassis; and a second circulation route, wherein the container moves in circulation along the second circulation route between the quay area and a container stack yard where the container is stored, and the container moves from the quay area to the container stack yard after subjecting the container to the radiation inspection in the quay area, and wherein a number of the cargo handling means and a number of the container transfer means installed on the first calculation route on which the automated guided vehicle or the truck chassis travels in circulation is at least one, and a number of the container inspecting means installed on the first calculation route on which the automated guided vehicle or the truck chassis travels in circulation is one or a number less than the number of the cargo handling means and the container transfer means.

8. A container inspection/cargo-handling method, comprising:

moving a container on an automated guided vehicle or a truck chassis in circulation along a first circulation route that is only in a quay area where a container ship anchors and where the container is transferred to/from the ship;

subjecting the container to radiation inspection when the automated guided vehicle or the truck chassis, loaded with the container received from the ship, is moving in circulation along the first circulation route in the quay area; and moving the container in circulation along a second circulation route between the quay area and a container stack yard where the container is stored, wherein the container is moved from the quay area to the container stack yard after subjecting the container to the radiation inspection in the quay area, the container is transferred to the second circulation route after the radiation inspection, and the automated guided vehicle or truck chassis is capable of switching between the first circulation route and the second circulation route.

* * * * *